April 13, 1926.　　　　　　　　　　　　　　　　　　　1,581,022
J. R. SAYLOR
AUTOMATIC TAPPING MACHINE
Original Filed June 29, 1923　　　3 Sheets-Sheet 2

Inventor-
John R. Saylor.
by his Attorneys.
Howson & Howson

April 13, 1926. 1,581,022
J. R. SAYLOR
AUTOMATIC TAPPING MACHINE
Original Filed June 29, 1923 3 Sheets-Sheet 3
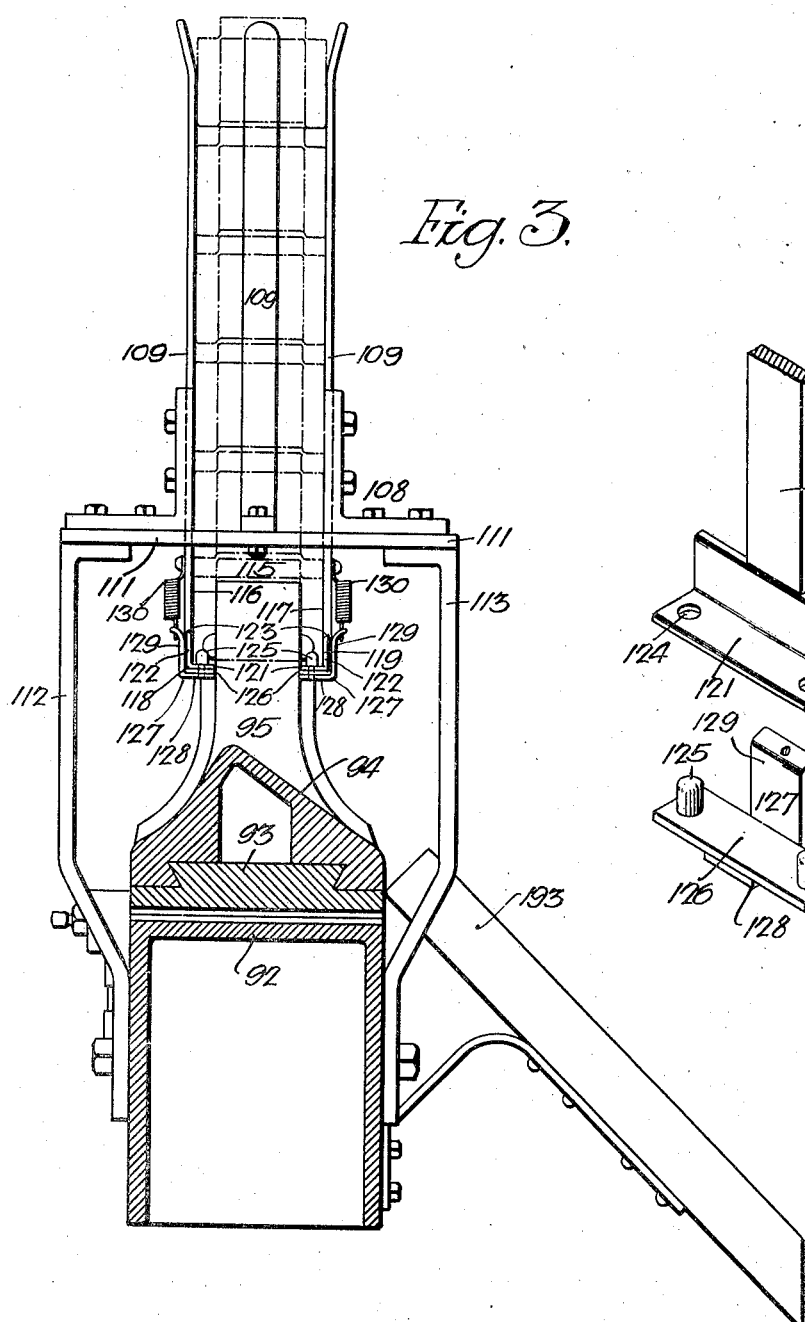

Patented Apr. 13, 1926.

1,581,022

UNITED STATES PATENT OFFICE.

JOHN R. SAYLOR, OF POTTSTOWN, PENNSYLVANIA.

AUTOMATIC TAPPING MACHINE.

Original application filed June 29, 1923, Serial No. 648,526. Divided and this application filed June 14, 1924. Serial No. 720,086.

*To all whom it may concern:*

Be it known that I, JOHN R. SAYLOR, a citizen of the United States, residing in Pottstown, Pennsylvania, have invented an Automatic Tapping Machine (being a division of application filed June 29, 1923, under Serial No. 648,526), of which the following is a specification.

My invention relates to feeding means, having particular relation to such means as are applicable to automatic tapping machines.

One object of my invention is to provide a magazine, the discharge outlet of which is provided with means for centering the article to be removed therefrom.

Another object of my invention is to provide a magazine comprising vertically upright members adapted to contain a series of articles, the magazine having a discharge outlet including a pair of depending spaced guideways terminating in base portions, and a reciprocally mounted chuck having relatively movable jaws, the path of travel of which lies intermediate said spaced guideways, whereby an article may be removed therefrom.

A further object of my invention is to provide a magazine with discharge apparatus, wherein so-called "L-fittings" may be maintained in a desired position to be embraced by the jaws of a movable chuck.

With these and other objects and applications in mind, my invention further consists in the details of construction and operation and arrangement, hereinafter set forth and claimed and illustrated in the accompanying drawings, wherein Fig. 1 is an enlarged, detail, side-elevational view of the magazine, showing the movable chuck in the tapping position, and the means for insuring the release of the finished article after the chuck jaws have moved from beneath the cutting tool, the end portion of the movable chuck constituting a resilient mounting for one end portion of the toggle joint being broken away;

Fig. 2 is a view similar to Fig. 1 but showing the movable chuck in the work-receiving position, wherein the magazine-discharge opening is positioned intermediate the relatively movable jaws of the chuck;

Fig. 3 is an enlarged, detail, transverse-sectional view of the magazine and the movable chuck, the sectional plane being taken on the line 3—3 of Fig. 2.

Figs. 4 and 5 are enlarged, detached perspective views illustrating the construction of the magazine discharge apparatus;

Fig. 6 is a sectional detail view of the magazine discharge apparatus slightly modified to receive L-fittings rather than T-fittings, as in the previous figures; and Fig. 7 is a top plan view of the structure of Fig. 8.

Figure 1:
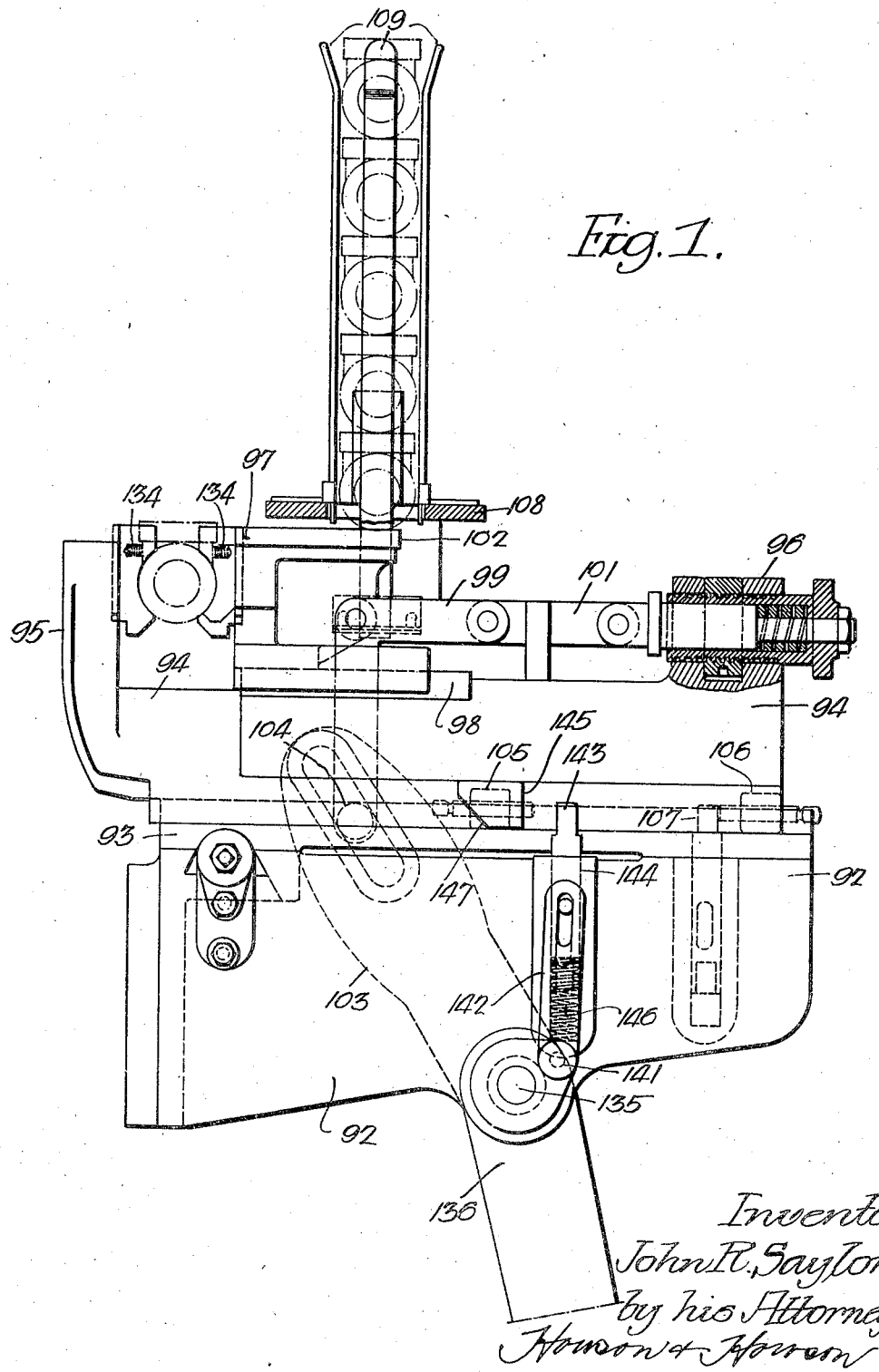

In the illustrated form of embodiment of my invention shown in the drawings, a bracket 92 is provided with an undercut rib 93, Fig. 1, which serves as a slidable mounting for a movable chuck 94. The movable chuck 94 comprises a stationary jaw 95 and a resilient abutment 96 spaced therefrom. Inasmuch as the details of the resilient abutment 96 have been previously described in my Patent No. 1,089,273, dated March 3, 1914, a detailed description is deemed unnecessary. A cooperating movable jaw 97 may be slidably mounted for longitudinal motion on ways 98 formed on the top side of the movable chuck 94. A bell-crank lever 99 is pivotally mounted on the movable jaw 97 and it has one end thereof connected by a link 101 with the resilient abutment 96. The movable jaw 97 may be provided with an extension 102 for reasons as will appear hereinafter.

A slotted arm 103, Figs. 3 and 4, engages a pin 104, which is carried by the remaining arm of the bell-crank lever 99, whereby the movable chuck 94 and the relatively movable jaw 97 may be actuated, as will be explained more fully hereinafter. A pair of lugs 105 and 106, which are mounted on the movable chuck 94, cooperate with a pin 107, which is carried by the bracket member 92. The lug 106 serves to limit the forward movement of the movable chuck 94 to a point where such work as may be contained between the jaws 95 and 97 is in alignment with, say the taps (not shown) of an automatic tapping machine. The lug 105 and pin 107 serve to limit the reverse movement of the chuck 94 to a point where the jaws 95 and 97 are in alignment with the discharge opening of a work magazine 108, as shown in Fig. 2.

The work magazine 108, Fig. 3, which in this particular instance has been designed to receive and to discharge T-fittings, comprises a plurality of vertically-extending guide strips 109, which are mounted on a plate 111 supported by side plates 112 and 113 rigidly secured to opposite sides of the bracket 92. The supporting plate 111 is provided with a central opening 114 through which the T-fittings are adapted to pass into a discharge structure 115, which is positioned in the path of travel of the movable clutch 94, whereby the movable jaws 95 and 97 may embrace and remove a fitting therefrom.

The discharge structure 115, of which Figs. 4 and 5 are detail perspective views and Fig. 3 is a side elevational view of the completed structure, comprises a pair of spaced extensions 116 and 117 of the strips 109 and base members 118 and 119, respectively, the extensions 116 and 117 constituting guideways for the fittings as they leave the magazine 108 and move into the chuck-engaging position shown in Fig. 2. The base members 118 and 119 comprise longitudinally-extending members having horizontal and vertical sides 121 and 122, respectively, the latter being rigidly positioned in recesses 123 in the extensions 116 and 117 and constituting continuations of the guideways formed by said extensions. The horizontally-extending sides 121 are provided with spaced perforations 124 adapted to receive removably centering pins 125 which are carried by plate members 126.

The plate members 126 are held in position to cause the several centering pins to extend up through the corresponding perforations by means of strips 127 having base portions 128 secured to plate members 126 and vertically extending portions 129 secured by springs 130 to the extensions 116 and 117.

The construction shown in Figs. 8 and 9 has been modified to provide for the centering of L-fittings rather than T-fittings as just described and differentiates over that of Fig. 5 in the provision of a shoe 131 for guiding the L-fittings as they pass from the magazine opening 114 into a discharge structure 132. The modification in the discharge structure 132 comprises the shortening of one of the extensions, say 116, and the mounting of a perforated plate 133 directly in the surface thereof. The centering pins 125 may be resiliently held in the perforations of the plate 133 by the force of the springs 130. The construction herein employed is otherwise the same as that just described in connection with the discussion of Figs. 4 and 5.

Further precautions, other than those effected by the resiliently mounted centering pins 125 may be observed to center properly the work, as the jaws 95 and 97 are about to embrace the same, by providing said jaws with outwardly extending centering springs 134, as shown for instance in Fig. 2, where the springs 134 are extended, or in Fig. 1, where the springs 134 are compressed.

Referring to the chuck-actuating mechanism shown more particularly in Figs. 1 and 2 of the drawing, the arm 103 is keyed to an actuating shaft 135 having a rocker arm 136 at the outer end thereof. The rocker arm 136 is operatively associated with a power source, the details of which form no part of the present invention. The other end of the rocking shaft 135 carries a crank 141 which is operatively associated by means of a link 142 with a locking pin 143. The latter is reciprocally mounted in a boring 144 in the bracket 92 and it is adapted to be reciprocated by the link 142 into and out of the path of a lug 145 mounted on the movable clutch 94.

The end of the link 142, which engages the pin 143 is slotted, thereby providing for the relative movement of the link 142 and the pin 143, while a spring 146, which is contained in the boring 144 between the base thereof and the pin 143, normally forces the latter into its outermost position, as shown in Fig. 1. One corner of the lug 145 is formed square, while the opposite corner is formed with a bevel surface 147, for reasons as will appear more fully hereinafter.

The arrangement of the crank 141 and the link 142 is such as to cause the pin 143 to engage the lug 145 to lock the chuck 94 when the jaws 95 and 97 thereof have moved a distance sufficient to bring such finished work as is contained therebetween out of alignment with the taps (not shown). Further motion of the rocker shaft 135 causes the arm 103 to move to break the toggle-joint formed by the bell-crank lever 99 and the link 101.

The turning of the shaft 135, however, causes the crank 141 to withdraw the locking pin 143 out of engagement with the square corner of the lug 145, permitting the chuck to continue in its movement. When the motion of the chuck 94 is reversed, the bevel surface 147 of the lug 145 subsequently engages the pin 143, so that the latter is moved downwardly by reason of the slotted connection between the same and the link 142, permitting the chuck 94 to continue unrestricted in its movement to the working position of Fig. 1. Attention is also directed to the fact that the movable jaw extension 102 serves to prevent articles from entering the discharge structure 115 only when the chuck 94 has moved into the work receiving position of Fig. 2.

In operation, when the rocker arm 136 is actuated, the slidable clutch 94 is moved from the work position, Fig. 1, until the lug 145 engages the crank operated pin 143.

Further movement of the lever arm 103 causes the toggle formed by the link 101 and the bell-crank lever 99 to break, moving the sliding jaw 97 an amount sufficient to release the finished work. When the work has been released, it passes from the chuck 94 through a chute 193, Fig. 3, to a receptacle (not shown). Further motion of the shaft 135 causes the locking pin 143 to be withdrawn out of engagement with the lug 145 and the movable chuck 94 to be actuated to a work-receiving position, as shown in Fig. 2.

As the movable jaw 97 and plate 102 are actuated past the outlet opening 114 of the magazine 108, a fitting moves into the discharge structure 115 where it is in position to be grasped by the jaws of the movable chuck 94. Reverse movement of the shaft 135 causes the work or fitting to be grasped firmly between the jaws of the chuck 94 and moved into the work position previously mentioned.

While I have shown a particular embodiment of my invention, for the purpose of describing the same and illustrating its principles of construction and operation, it is apparent that various changes and modifications may be made therein, without departing from the spirit and scope of my invention. I desire, therefore, that only such limitations shall be imposed thereon, as are indicated in the appended claims or as are demanded by the prior art.

I claim:

1. A magazine having an outlet comprising guideways in predetermined spaced relation, said guideways having portions constituting a seat for the article to be discharged, and resilient means for preventing the tilting of said article on said seat.

2. In combination, a magazine having an outlet comprising spaced guideways terminating in spaced base portions consituting a seat, said base portions being provided with resiliently mounted centering members.

3. In combination, a magazine having an outlet comprising forwardly extending spaced members constituting guideways, angle members having corresponding sides secured to the end portions of said guideways, the remaining corresponding sides constituting base portions for said guideways, said base portions being provided with perforations, centering pins mounted on supporting members and positioned to extend up through said perforations, and means for resiliently securing said pins in said latter position.

4. In combination, a magazine having discharge apparatus comprising forwardly extending spaced members constituting guideways, angle members having corresponding sides secured to the end portions of said guideways in such manner as to constitute continuations of said guideways, the other sides forming spaced base portions for said spaced guideways, said base portions being provided with perforations, centering pins mounted on supporting members and positioned to extend up through said perforations, said supporting members being provided with projecting portions, and resilient means for securing said pins in said last-mentioned position.

5. In combination, a magazine having discharge apparatus comprising forwardly extending spaced members constituting guideways, angle members having corresponding sides secured to the end portions of said guideways, the other sides constituting base portions for said guideways, said base portions being provided with perforations, centering pins mounted on supporting members and positioned to extend up through said perforations, means for resiliently securing said pins in said latter position, and a movable chuck having relatively movable jaws, said base portions being so spaced as to permit the passage therebetween of said movable chuck.

6. In a magazine, a discharge outlet comprising a pair of spaced guides, means constituting a seat for the article to be removed, and means extending from said seat so as to center resiliently said article.

7. A magazine comprising a pair of members constituting a seat for an article to be removed, and centering pins operatively associated with said seat so as to maintain said article in a desired position thereon.

8. A magazine outlet comprising a pair of members adapted to permit the passage therebetween of a chuck, said members constituting a seat for an article to be removed, and centering means for said article extending from said seat.

9. In a magazine, a pair of spaced guiding members, of which one at least is formed to constitute a seat for an article to be removed, one of said members being provided with a plurality of centering pins adapted to extend therefrom into operative relation with said article.

10. A magazine having a guiding member terminating in a portion adapted to constitute a support for the article to be removed, and centering means for said article extending outwardly from said portion.

11. In a magazine, a guiding member having an angularly disposed portion constituting a support for the article to be removed, and resilient centering means in operative relation to said seat, whereby said article may be supported in a desired position thereon.

12. In a magazine, a guiding member provided with a portion constituting a support for an article to be removed, and a plurality of centering pins extending from said support, 13. Apparatus of the character described comprising a guiding member provided with a portion constituting a support for an article to be removed, and a plurality of resiliently mounted centering pins extending from said support.

14. In a magazine, a guiding member having a transversely extending flange provided with apertures, and a plurality of resiliently mounted centering pins positioned in said apertures and extending from said flange.

15. A magazine having a guiding member provided with an apertured, transversely extending flange, and a plurality of pins having resiliently mounted supporting means guided by said member.

16. A magazine having an outlet including a guiding member, a member having one side secured to said guiding member, a transversely extending side positioned to constitute a supporting point for the article to be removed and also apertured, centering pins in the apertures, and resilient supporting means for said pins.

17. Apparatus of the character described comprising a magazine outlet having a guiding member provided with a portion constituting a seat for the article to be removed, and means extending from said seat whereby the article may be maintained in a desired position thereon, said means including a resiliently mounted guided element.

18. A magazine comprising upright members adapted to contain a series of articles, said magazine having a discharge outlet comprising a pair of depending spaced guideways terminating in base portions, the latter being provided with resiliently mounted centering pins.

19. In a magazine, a discharge outlet including a member constituting a guideway, a second member having one side portion so secured to said guideway as to constitute a continuation thereof, the other side constituting a support for the article to be discharged, centering pins positioned to extend from said supporting side, and supporting means for said pins having a resilient mounting positioned to be guided by said first-mentioned member.

20. A magazine having a guiding strip, a member having one side positioned to constitute a continuation of said strip and the other side apertured and constituting a seat for the article to be removed, a pair of pins, a member constituting a support for said pins having a projecting portion, and resilient means operatively associated with said latter portion whereby said pins may be resiliently positioned in said apertures.

JOHN R. SAYLOR.